April 20, 1965  C. W. MacMILLAN  3,178,927
ODOMETER-SPEEDOMETER TESTING
Filed Sept. 26, 1960  2 Sheets-Sheet 1
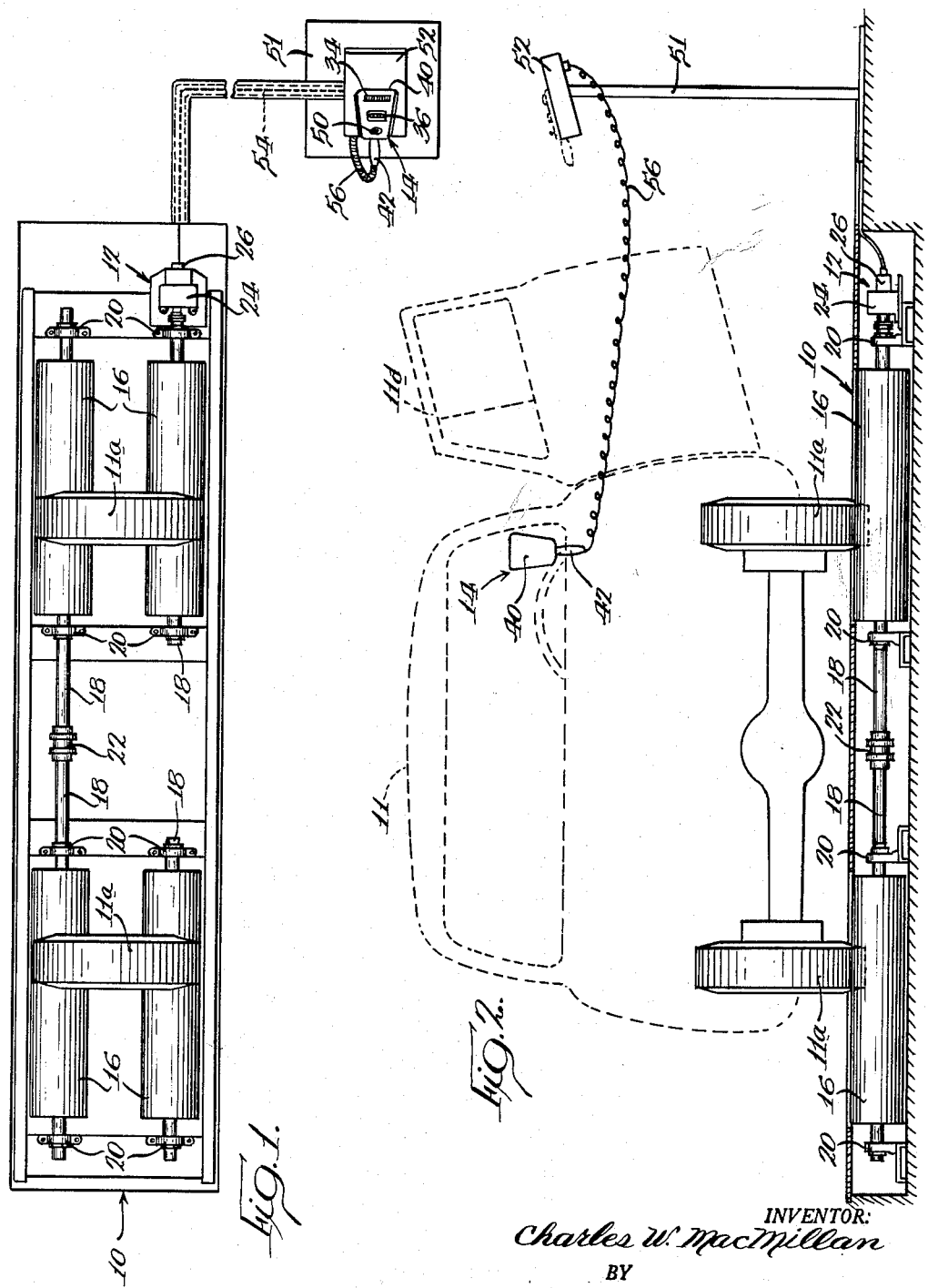
INVENTOR:
Charles W. MacMillan
BY
Gary, Desmond & Parker
Att'ys

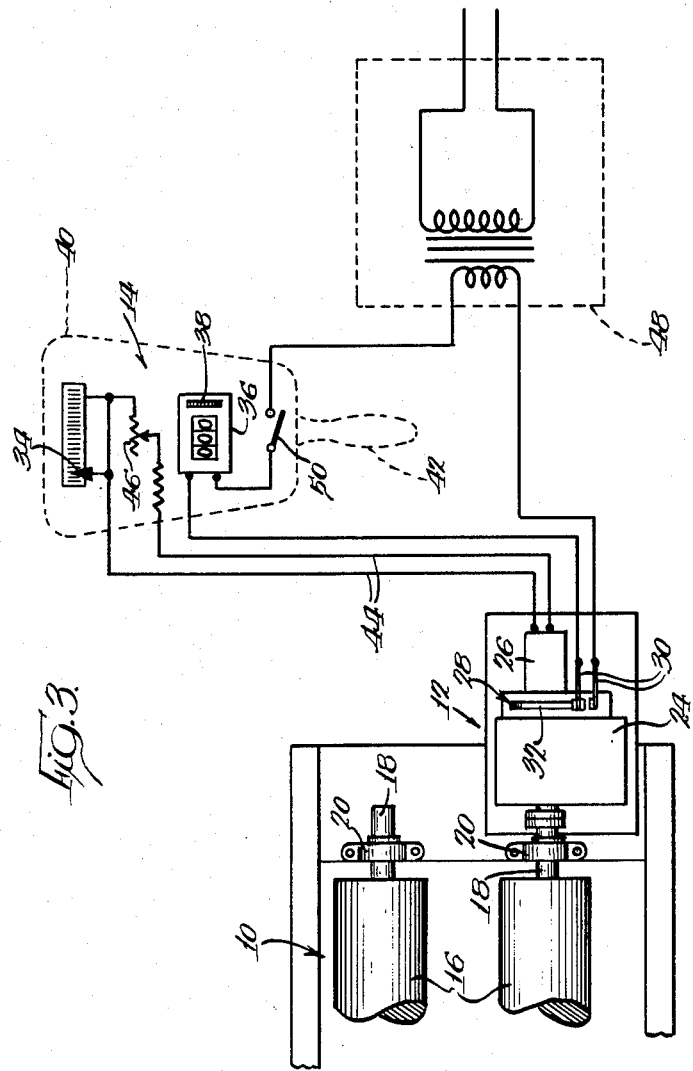

United States Patent Office 3,178,927
Patented Apr. 20, 1965

3,178,927
ODOMETER-SPEEDOMETER TESTING
Charles W. MacMillan, Rock Island, Ill., assignor to Bear Manufacturing Company, Rock Island, Ill., a corporation of Delaware
Filed Sept. 26, 1960, Ser. No. 58,552
2 Claims. (Cl. 73—2)

The present invention relates to the testing of odometers and speedometers in automobiles, trucks and like vehicles, and particularly, to improved apparatus for testing the accuracy of the meters under actual operating conditions, and to an improved process of testing odometers.

The accurate calibration of odometers and speedometers on vehicles depends on the correct gear ratios and tire sizes to match the odometer which usually is cable-driven from the propeller shaft or transmission output shaft of the vehicle. In connection with commercial vehicles, such as taxicabs, and trucks and cars that are rented, the revenue therefrom is based at least partially on the miles traveled, and the correct indication of the odometer therefore is important. Inasmuch as the changing of rear axle gear ratios and tire sizes, particularly in commercial vehicles, affects the odometer gearing relationship, considerable error can be introduced in making changes. Although there are available correction gear assemblies to correct for changing the rear axle ratios, the principal problem is first to determine whether or not such change is necessary. In order to test the odometer accuracy of a vehicle, it is conventional practice at the present time for the operator to drive the vehicle over a measured distance, such as one mile, and note the odometer reading, or to disconnect the speedometer cable and connect it to a master meter plus any required gear ratio changers and to run the vehicle for a measure mile or like distance.

The object of the present invention is to eliminate the time and work required to make the test to determine whether or not the odometer is accurate. A further object is to permit this test to be made indoors without removing the vehicle from the premises and yet facilitate a test that is 100% accurate.

It is in particular an object of this invention to provide an improved odometer testing process comprising the steps of rotating the drive wheels of the vehicle in a forward direction, especially by disengaging the drive wheels from driving engagement with fixed surfaces and rotating the same freely by means of the vehicle engine and drive train, causing the rotating wheels to transmit a motivating signal for a counter that is calibrated in distance units in correlation with the drive wheels and the signal transmitted thereby, coupling the signal to the counter when one indicia of the lowest digital indicator of the vehicle odometer is centered relative to the other indicators thereof, uncoupling the signal from the counter when the said lowest digital indicator of the odometer has completed a predetermined number of revolutions, and comparing the number of revolutions of the indicators of the counter to said predetermined number of revolutions of said lowest digital indicator of the odometer.

Inasmuch as the odometers of vehicles manufactured in the United States read in miles and tenths of miles, the accuracy of an odometer reading is one-tenth or 10% in a mile. Unless one wishes to guess how much the tenth figures in the odometer are off the center position when the test is run, the roughly 10% accuracy in a mile is the best one has heretofore been able to obtain. To provide a percent accuracy reading in the process of the present invention as above described, it is a further object of the invention to employ a counter that is calibrated to at least hundredths of the same distance units as the vehicle odometer, to couple the signal to the counter when one indicia of the tenths indicator of the vehicle odometer is centered, to uncouple the signal from the counter when said tenths indicator of the odometer has completed one or a multiple of ten revolutions, and then to read directly from the indicators of the counter the percent accuracy of the odometer.

Another object of the invention is to provide improved apparatus for practicing the defined process and comprising roller means for rotatably supporting the drive wheels of the vehicle while the vehicle remains stationary, a pair of contacts intermittently closed and opened by said roller means as a function of the movement imparted to said roller means by the drive wheels of the vehicle, a magnetic counter calibrated in distance units in correlation to said roller means and said contacts, a control switch for said counter, and an odometer test circuit including in series therein said contacts, said counter and said switch.

A further object of the invention is to incorporate in the above described apparatus means for testing the vehicle speedometer, said means comprising a generator driven by said roller means and an electrical meter electrically connected to said generator and calibrated in speed units in correlation to said roller means and said generator.

A still further object of the invention is the provision of improved testing apparatus as described in the preceding paragraphs including a portable case housing the electromagnetic counter, the control switch and the electrical meter, and elongate flexible conductors connecting the encased components to the roller-operated contacts and generator, whereby the case may be carried into the vehicle during the test and may be held by the operator while he manipulates the accelator to drive the vehicle wheels, whereby the operator may readily compare the speedometer reading to the test meter and initiate and stop operation of the counter in accordance with the readings of the vehicle odometer.

Other objects and advantages of the invention will become apparent in the following detailed description.

Now, in order to acquaint those skilled in the art with the manner of making and using my improved apparatus, and of practicing my improved process, I shall describe, in connection with the accompanying drawings, a preferred embodiment of the apparatus of the invention, and a preferred manner of making and using the same.

In the drawings:

FIGURE 1 is a plan view of a preferred embodiment of the apparatus of the invention;

FIGURE 2 is an end view, partly in section and partly in elevation, of the apparatus shown in FIGURE 1; and FIGURE 3 is a schematic circuit diagram of the test apparatus.

Referring now to the drawings, the apparatus of the invention is comprised essentially of roller means 10 for rotatably supporting the drive wheels 11a of the vehicle 11, electric signal generating means 12 driven by the roller means 10, and instruments 14 for receiving the signals from the means 12 and providing a visual indication of the speed of the wheels and the distance traveled thereby.

The roller means 10 are preferably comprised of two pairs of rollers 16, the two rollers of each pair being disposed in spaced parallel relation for reception thereon of a wheel and the two pairs being disposed in longitudinally spaced relation to receive the two drive wheels, usually the rear wheels 11a, of a vehicle. To accommodate a wide variety of vehicles, from small or midget passenger cars to standard size automobiles and on up to trucks of various sizes, the two pairs of rollers are spaced by a distance less than the tread width of the smallest car and each roller is of such length as to define an overall length at least equal to the greatest tread width to be encountered. The rollers are preferably mounted in a hollow pit in the floor of the garage or test station, but may also be mounted in a test stand or rack as desired, as is well-known in the art. Each roller 16 is equipped with a supporting shaft 18 and each shaft is journalled in bearings 20 disposed adjacent the opposite ends of the respective roller. The rear rollers of the two pairs are interconnected by a coupler 22, whereby all four rollers will operate at the same speed. As is conventional in the art, the rollers are equipped with brake means (not shown) so that the rollers may be held stationary to facilitate driving a vehicle onto and off of the rollers. In making a test, the brake is released so that the drive wheels 11a may rotate freely while the vehicle itself is stationary.

The signal generating means 12 is operated off of the drive shaft 18 of one of the rollers 16 and in the preferred embodiment is comprised of a speed-reducing unit 24, a signal generator 26, such as an electric tachometer generator, driven by the output shaft of the reduction unit 24, and an impulse signal generator 28 comprised of a pair of contacts 30 and a cooperating cam 32 mounted on the output shaft of the unit 24 (see FIGURE 3). Preferably, the contacts 30 are normally open and the cam is adapted to close the contacts once per revolution of the shaft of the speed-reducing unit.

The indicator means 14 comprises an electrical meter 34, preferably a D.C. milliammeter calibrated relative to the roller means 10, the speed-reducing unit 24 and the tachometer generator 26 to indicate speed units, i.e., miles per hour; and an electromagnetic counter 36 calibrated relative to the roller means 10, the speed-reducing unit 24 and the impulse signal generator 28 to indicate distance units, i.e., miles. Specifically, the counter 36 preferably comprises three revolvable drums calibrated to indicate (from left to right as shown in FIGURE 3) miles, tenths of miles and hundredths of miles. Also, the counter includes a thumb wheel 38 for manually re-setting the counter to zero when desired. The indicators are mounted in a small portable case or housing 40 which preferably includes a handle 42 facilitating manipulation of the same.

As indicated schematically in FIGURE 3, the generator 26 is connected directly to the meter 34 by a pair of leads 44, and a variable resistor 46 is included in the circuit in series with the meter to facilitate exact calibration of the same, the resistor preferably being mounted in and normally enclosed by the case 40, so as to prevent unauthorized tampering with the same. The odometer test circuit is supplied from any suitable source, preferably via a transformer 48 so as to afford the safety factor of a low voltage system, and the source is connected in series with the contacts 30 of the impulse signal generator, the counter 36 and a master control switch 50 for the circuit. The switch 50 is also mounted in the case 40 and preferably comprises a normally open switch having a push button or toggle lever extending to the exterior of the case to accommodate manual closing of the switch, and thus of the normally open counter circuit.

In the preferred embodiment of the invention, the apparatus includes a stand 51 which is disposed in longitudinally and transversely spaced relation to the roller means 10 so as to be located adjacent the door 11d to the operator's station in the vehicle. The stand is provided at its upper end with a box-like structure 52 the upper surface of which comprises a rest for the portable instrument case 40. Leads or conductors 54 extend from the signal generator means 26 and 28 to the box 52 and are coupled within the interior of the box to complemental flexible conductors which extend from the box to the casing 40 and to the meter 34 and the counter 36 and its switch 50, respectively. The flexible conductors last mentioned are suitably combined in a multi-wire flexible cable 56, such as a normally coiled, stretchable cable, so the cable is neatly stored when the case 40 is rested on the stand and so that the case may readily be carried from the stand into the interior of the vehicle as schematically depicted in FIGURE 2.

In use of the apparatus, the operator drives the vehicle into the test area to locate the vehicle with its drive wheels on the roller means 10. The roller brake is then released and the operator picks up the instrument case 40 and carries it with him into the vehicle. The operator, by manipulation of the thumb wheel 38, sets the counter 36 to zero and he then manipulates the vehicle accelerator pedal to rotate the drive wheels 11a. As he does so, the vehicle speedometer and odometer operate in the usual manner, and the rollers are rotated to cause the tachometer generator 26 to transmit a signal to the meter 34, whereupon the operator may compare the meter readings to the speedometer readings at various speeds to ascertain the accuracy of the speedometer. The operator then watches the vehicle odometer and when one indicia of the tenths indicator is centered in the odometer window, he depresses the button or throws the toggle lever of the master switch 50 to close the circuit of the electromagnetic counter 36, and he holds the circuit closed while he observes the vehicle odometer until the vehicle odometer indicates a predetermined distance of travel, whereupon he releases the button or throws the lever to open the counter circuit. The counter will then indicate the actual distance of travel as compared to the distance indicated by the odometer. While various distances may be choosen for test purposes, I prefer to utilize a distance of either one mile or ten miles, whereupon with the counter arranged as described herein, the counter will indicate directly the percent accuracy of the vehicle odometer, i.e., if one mile on the odometer is used as the test criterion, and the counter indicates 095, the odometer is 95% accurate, or is reading high by 5%, whereas if the counter reads 105 the odometer is 105% accurate, or is reading low by 5%. When the percent accuracy is determined, correction can readily be made in the odometer drive train, and/or the correction factor has been ascertained so that the factor can be applied to revenue based on vehicle miles indicated on the odometer. When the test is completed, the operator returns the test instrument 40 to the stand 51, applies the brake to the rollers 16 and drives the vehicle away.

Since the test instrument is driven from the rollers, the readings will be accurate for all vehicles tested irrespective of the tire sizes and gear ratios of the vehicles.

From the foregoing, it is to be appreciated that I have provided improved apparatus for testing vehicle speedometers and odometers whereby the test may be effected at the testing station or garage without requiring the operator to drive the vehicle in traffic or over measured mile courses or the like, and whereby the test is completed with 100% accuracy to provide a percentage correction factor for the odometer of substantially any vehicle. Also, the test is completed without requiring disassembly of the parts of, or any modification whatever in, the vehicle being tested. In addition, I have described the preferred mode of practice of my improved odometer testing process, which description renders apparent to those skilled in the art the steps which characterize my invention. As will be obvious to them, the process may be practiced with a variety of means. Consequently, I have established that all of the objects and advantages of this invention are obtained in a convenient, practical and economical manner.

While I have shown and described what I regard to be the preferred embodiment of my improved testing apparatus, and the preferred manner of practicing my improved testing process, it will be appreciated that various changes and rearrangements may be made therein with-

I claim:

1. In apparatus for testing vehicle odometers as a function of simulated travel over a selected test distance as revealed by the vehicle odometer; the improvement comprising a normally unactuated test instrument adapted to be actuated as a function of rotation of the wheels of the vehicle in traveling the simulated distance, said instrument having at least two indicators initially set to zero and calibrated respectively to hundredths and tenths of the actual distance selected as the test distance, and control means for said instrument accommodating actuation thereof when the vehicle odometer indicates any given distance reading and for rendering the same unactuated at the moment when the vehicle odometer indicates vehicle travel of the selected test distance from said given reading, whereby the percent accuracy of the vehicle odometer may be read directly from the instrument.

2. In apparatus for testing vehicle odometers as a function of simulated vehicle travel over a selected test distance as revealed by the vehicle odometer, and wherein the accuracy of the odometer is determined by comparison to the reading of a test instrument actuated as a function of rotation of the wheels of the vehicle in traveling the simulated distance, said instrument being normally unactuated and adapted to be actuated as a function of wheel rotation, said instrument having at least two indicators initially set to zero and calibrated respectively to hundredths and tenths of the actual distance selected as the test distance, control means for said instrument accommodating actuation thereof when the vehicle odometer indicates any given distance reading and for rendering the same unactuated at the moment when the vehicle odometer indicates vehicle travel of the selected test distance from said given reading, whereby the percent accuracy of the vehicle odometer may be read directly from the instrument, and means for re-setting said indicators to zero.

References Cited in the file of this patent

UNITED STATES PATENTS

| | | |
|---|---|---|
| 1,611,089 | Wallis | Dec. 14, 1926 |
| 1,790,128 | Winne | Jan. 27, 1931 |
| 2,032,489 | Marshall | Mar. 3, 1936 |
| 2,607,212 | Rose | Aug. 19, 1952 |
| 3,021,703 | Pfrehm | Feb. 20, 1962 |
| 3,028,744 | Bagwell | Apr. 10, 1962 |

ISAAC LISANN, *Primary Examiner.*